United States Patent [19]

Hall

[11] Patent Number: 6,071,326
[45] Date of Patent: Jun. 6, 2000

[54] PROCESS FOR THE PRODUCTION OF NAPHTHA GAS FROM LANDFILL GAS

[75] Inventor: Thomas Lee Hall, Austin, Tex.

[73] Assignee: Ecogas Corporation, Austin, Tex.

[21] Appl. No.: 09/118,253

[22] Filed: Jul. 16, 1998

[51] Int. Cl.[7] .......................... B01D 53/047; B01D 53/14; B01D 53/22
[52] U.S. Cl. .......................... 95/41; 95/42; 95/51; 95/96; 95/117; 95/136; 95/139; 95/143; 96/4; 96/108; 96/136; 96/142; 96/243
[58] Field of Search ................................ 95/39, 41, 42, 95/51, 96, 117–119, 122, 136, 139, 141, 143, 148; 96/4, 108, 130, 134, 136, 142, 144, 243

[56] References Cited

U.S. PATENT DOCUMENTS

| | | | |
|---|---|---|---|
| 3,699,218 | 10/1972 | Smith et al. | 95/139 X |
| 4,077,779 | 3/1978 | Sircar et al. | 55/25 |
| 4,089,941 | 5/1978 | Villemin | 423/654 |
| 4,130,403 | 12/1978 | Codey et al. | 95/51 X |
| 4,518,399 | 5/1985 | Croskell et al. | 95/51 |
| 4,597,777 | 7/1986 | Graham | 95/51 |
| 4,681,612 | 7/1987 | O'Brien et al. | 95/39 X |
| 4,770,676 | 9/1988 | Sircar et al. | 55/26 |
| 4,869,894 | 9/1989 | Wang et al. | |
| 4,957,715 | 9/1990 | Grover et al. | 423/228 |
| 5,248,488 | 9/1993 | Yan | 95/117 X |
| 5,411,721 | 5/1995 | Doshi et al. | 423/220 |
| 5,451,249 | 9/1995 | Spiegel et al. | 96/144 X |
| 5,681,360 | 10/1997 | Siwajek et al. | 48/127.3 |

FOREIGN PATENT DOCUMENTS

| | | | |
|---|---|---|---|
| 0231996 | 1/1986 | Germany | 95/39 |
| 95/30825 | 11/1995 | WIPO | |

OTHER PUBLICATIONS

International Search Report, Application No. PCT/US99/16086, mailed Nov. 22, 1999.

Sircar "Separation of Methane and Carbon Dioxide Gas Mixtures by Pressure Swing Adsorption," Separation Science And Technology, 23(6&7), pp. 519–529, copyright by Marcel Dekker, Inc., 1988.

Pro–Quip Process Technology Information brochure for "Hydrogen and Synthesis Gas Production", Jan. 1998, 8 sheets.

GSF Ecogas brochure for "Emission Control and Energy" Jan. 1998, 12 sheets.

*Primary Examiner*—Robert H. Spitzer
*Attorney, Agent, or Firm*—Conley, Rose & Tayon PC

[57] ABSTRACT

The production of naphtha gas from landfill gas is preferably accomplished through a gas purification step, a catalytic conversion of methane gas to hydrogen gas, and a blending step in which various process streams are blended to produce the naphtha gas stream. The landfill gas stream is first treated through a gas purification/separation procedure to produce a substantially pure methane stream. The purified methane stream is then split into at least two portions. The first portion is fed into a hydrogen reformer and a shift reactor, where the methane gas is converted into a hydrogen-bearing stream which includes hydrogen and carbon dioxide. The second portion of the stream is preferably fed into a mixer. In the mixer, the pure methane stream, the hydrogen-bearing stream and a portion of the purified landfill gas stream are preferably blended together to form a naphtha gas stream.

53 Claims, 2 Drawing Sheets

PROCESS FOR THE PRODUCTION OF NAPHTHA GAS FROM LANDFILL GAS

BACKGROUND OF THE INVENTION

1. Field of the Invention

This invention generally relates to the production of naphtha gas. More particularly, the invention relates to the conversion of landfill gas to naphtha gas.

2. Description of the Related Art

Landfill gas has the potential to become an important source of renewable energy throughout the world. Landfill gas is typically formed from the natural anaerobic decomposition of cellulose materials in landfills. This decomposition produces methane and carbon dioxide, both greenhouse gases, in approximately equivalent amounts. If uncontrolled, this gas typically migrates to the atmosphere, aggravating global warming conditions. In addition, landfills tend to emit trace amounts of other gases, including volatile organic compounds (VOCs), which may lead to the formation of ozone. Without proper controls these gases have the potential to adversely effect our environment. When collected and controlled, these gases may be used to power electric generators, used as fuels for boilers, or processed into a stream of purified methane.

Naphtha gas is a fuel gas that is typically produced from the cracking of naphtha fuel. Naphtha fuels typically are refined light distillate fractions, usually boiling below 250° C., but often with a fairly wide boiling range. Gasoline and kerosene are the most well-known, but there are a whole range of special-purpose hydrocarbon fractions that can be described as naphtha. The petroleum refining industry calls the 0–100° C. (0–212° F.) fraction from the distillation of crude oil "light virgin naphtha" and the 100–200° C. (212–392° F.) fraction "heavy virgin naphtha". The cracking of naphtha fuels typically produces naphtha gas which includes about 40–60% by volume hydrogen, about 20–40% by volume methane, and about 10–30% by volume carbon dioxide. Naphtha gas is commonly used in devices such as power generators, heaters, and steam boilers.

Many heating and power generating devices are incapable of running off of landfill gas obtained directly from a landfill. In order to make a landfill gas stream usable in such devices, the gas stream may be subjected to a variety of purification processes which separate methane from the carbon dioxide in the stream. The separated methane may be used as fuel for various heating and power generating devices. Systems and methods for purifying gas streams which include a mixture of methane and carbon dioxide are described in U.S. Pat. No. 4,077,779 to Sircar et al., U.S. Pat. No. 4,770,676 to Sircar, et al. and U.S. Pat. No. 5,681,360 to Siwajek et al., all of which are incorporated by reference as if set forth herein. While methane gas may be used to run some devices, such devices which have been configured to use naphtha gas typically are incapable of running properly on pure methane fuel.

In order to utilize landfill gas resources in areas where a significant number of devices rely on naphtha gas for fuel, it is typically necessary to abandon or substantially modify the existing naphtha burning equipment. The cost associated with replacing or upgrading naphtha burning equipment may be prohibitive, due to the capital required to purchase and install the improved equipment, as well as costs associated with training of the maintenance personnel in the operation and care of the new equipment.

It would therefore be desirable to devise a method for the conversion of landfill gas to naphtha gas. Such a method may allow the continued use of existing naphtha fueled equipment, while making use of landfill gas as the primary source of fuel.

SUMMARY OF THE INVENTION

In one embodiment, the conversion of landfill gas to naphtha gas may be accomplished by the addition of hydrogen gas to a landfill gas stream, as well as the adjustment of the methane/carbon dioxide ratio. Through a series of gas separation and purification steps, coupled with a catalytic conversion of methane to hydrogen gas, the efficient conversion of landfill gas to naphtha gas may be accomplished.

The landfill gas is preferably collected through a series of wells and pipe laterals which extend into the landfill area. The collected landfill gas is preferably processed in a phase separator. The phase separator preferably removes free water from the landfill gas stream. After the free water has been removed, the landfill gas stream preferably undergoes further dehydration (i.e., removal of water). The landfill gas stream is preferably compressed to an elevated pressure and chilled in a refrigeration system to remove any remaining water. A portion of this dehydrated landfill gas stream may be conducted to the gas compressor for use as fuel for the compressor.

The dehydrated landfill gas stream is preferably conducted at elevated pressure to a pretreatment system in which volatile organic compounds and hydrogen sulfide are preferably removed from the stream. The volatile organic compounds may be removed by passage of the stream through an activated carbon based adsorption system. The removal of hydrogen sulfide may be accomplished by use of a desulfurization system. After treatment, the concentration of volatile organic compounds and hydrogen sulfide in the landfill gas stream is preferably reduced to less than about 0.1 part per million by volume ("ppmv").

At this point, the gas stream leaving the pretreatment system will preferably have a composition of about 50% by volume methane and 50% by volume carbon dioxide. Volatile organic compounds, hydrogen sulfide, and water have preferably been reduced to less than 1% by volume of the total landfill gas stream. A portion of this purified landfill gas stream may be used as fuel in a hydrogen reformer system. A second portion of this stream may be used for the blending of naphtha gas.

The purified landfill gas stream is preferably conducted to a methane purification system. In the methane purification system, methane gas is preferably separated from the landfill gas stream such that two substantially pure streams are formed, a methane stream and a carbon dioxide stream. The methane is preferably separated out of the gas stream by a vacuum pressure swing adsorption process. In this process, carbon dioxide is preferably adsorbed onto a regenerable solid adsorptive material. This material preferably has a higher affinity for carbon dioxide than for methane. During this process, the pressure within the chamber may be periodically reduced to liberate carbon dioxide and restore the adsorptive capacity of the adsorbent.

In another embodiment, the carbon dioxide may be absorbed into a regenerable liquid absorbent that has a higher selectivity for carbon dioxide than for methane. In yet another embodiment, the methane and carbon dioxide may be separated by use of a membrane which selectively permits the passage of either carbon dioxide or methane to yield a purified methane stream.

After purification, the methane gas stream is preferably divided into two portions. A first portion of the purified methane gas stream is preferably processed in a hydrogen reformer and a shift reactor. Within the hydrogen reformer, the methane is preferably converted into hydrogen, carbon monoxide, and carbon dioxide gas. The stream is then conducted to a shift reactor where carbon monoxide within the stream is preferably converted into carbon dioxide and hydrogen. Overall, the processing of the methane stream within the hydrogen reformer and the shift reactor preferably converts the methane to a gas stream that includes hydrogen and carbon dioxide in a ratio of about 4:1. By initial purification of methane, very high conversion of methane to hydrogen may be achieved. Since carbon dioxide is a major product of the process, failure to remove carbon dioxide from the landfill stream would tend to drive the reaction to the reactant side and yield less hydrogen. By the use of purified methane, the reaction is preferably driven toward a 4:1 production of hydrogen and carbon dioxide products.

In an embodiment, the hydrogen reformer reactor is fueled with a portion of the purified landfill gas stream (e.g., the blend of 50% by volume methane and 50% by volume carbon dioxide produced from the pretreatment system). Since the fuel gas used to fuel the heater of the hydrogen reformer does not mix with the process gas, the presence of carbon dioxide in the fuel gas has no effect on the hydrogen reformation reaction. In another embodiment, the hydrogen reformer may be fueled by gas drawn directly from the landfill, following passage through the methane purification system or from other sources.

After passage through the hydrogen reformer and the shift reactor, the methane stream is preferably converted into a hydrogen-bearing stream. The hydrogen-bearing stream is preferably cooled to recover the excess steam used in the reaction. Following cooling, the hydrogen-bearing stream will preferably have a composition of about 70–80% by volume hydrogen, 10–20% by volume carbon dioxide, 0–5% by volume carbon monoxide, and 0–5% by volume methane.

The hydrogen-bearing stream is preferably conducted to a gas mixer, where it is blended with other process streams to produce naphtha gas. In the gas mixer, the hydrogen-bearing stream is preferably blended with a portion of the purified landfill gas stream and a portion of the purified methane stream. A stream of purified carbon dioxide, produced during the methane purification step, may also be blended to ensure that the produced naphtha gas stream includes a sufficient amount of carbon dioxide. The naphtha gas formed preferably includes between about 40–60% hydrogen, between about 20–40% methane, and between about 10–30% carbon dioxide. More preferably, the formed naphtha gas includes between about 48–51% by volume hydrogen, between about 27–31% by volume methane, between about 17–19% by volume carbon dioxide, between about 0–2.5% by volume carbon monoxide, between about 0–0.5% by volume water, less than about 0.2% by volume oxygen, and less than about 0.1 ppmv VOCs and hydrogen sulfide. The naphtha gas stream may be delivered for end use in equipment which is designed to operate on naphtha gas.

DETAILED DESCRIPTION OF THE PREFERRED EMBODIMENTS

Naphtha gas is a fuel gas that is typically produced from the cracking of naphtha fuel. As used in this patent, the term "naphtha gas" is taken to mean a gas which includes a mixture of hydrogen, methane, and carbon dioxide. As used in this patent, the term "landfill gas" is taken to mean any gas which includes a mixture of methane and carbon dioxide gases. Typically, landfill gas includes about 40–60% methane, 40–60% carbon dioxide, and trace amounts of contaminants such as volatile organic compounds ("VOCs") and hydrogen sulfide. Landfill gas is typically produced in landfills via the decomposition of cellulose materials. While this may be the primary source of landfill gas, it should be understood that any gas stream containing mixtures of carbon dioxide and methane may be used as "landfill gas" in the current method.

The production of naphtha gas from landfill gas is preferably accomplished through a gas purification step, a catalytic conversion of methane gas to hydrogen gas, and a blending step in which various process streams are blended to produce the naphtha gas stream. The landfill gas stream is preferably treated through a gas purification/separation procedure to produce a substantially pure methane stream. The purified methane stream is preferably split into at least two portions. The first portion is preferably fed into a hydrogen reformer and a shift reactor, where the methane gas is converted into a hydrogen-bearing stream which includes hydrogen and carbon dioxide. The second portion of the stream is preferably fed into a mixer. In the mixer, the pure methane stream, the hydrogen-bearing stream and a portion of the purified landfill gas stream are preferably blended together. The mixing of the streams is preferably controlled such that a naphtha gas stream is produced.

Figure 1:
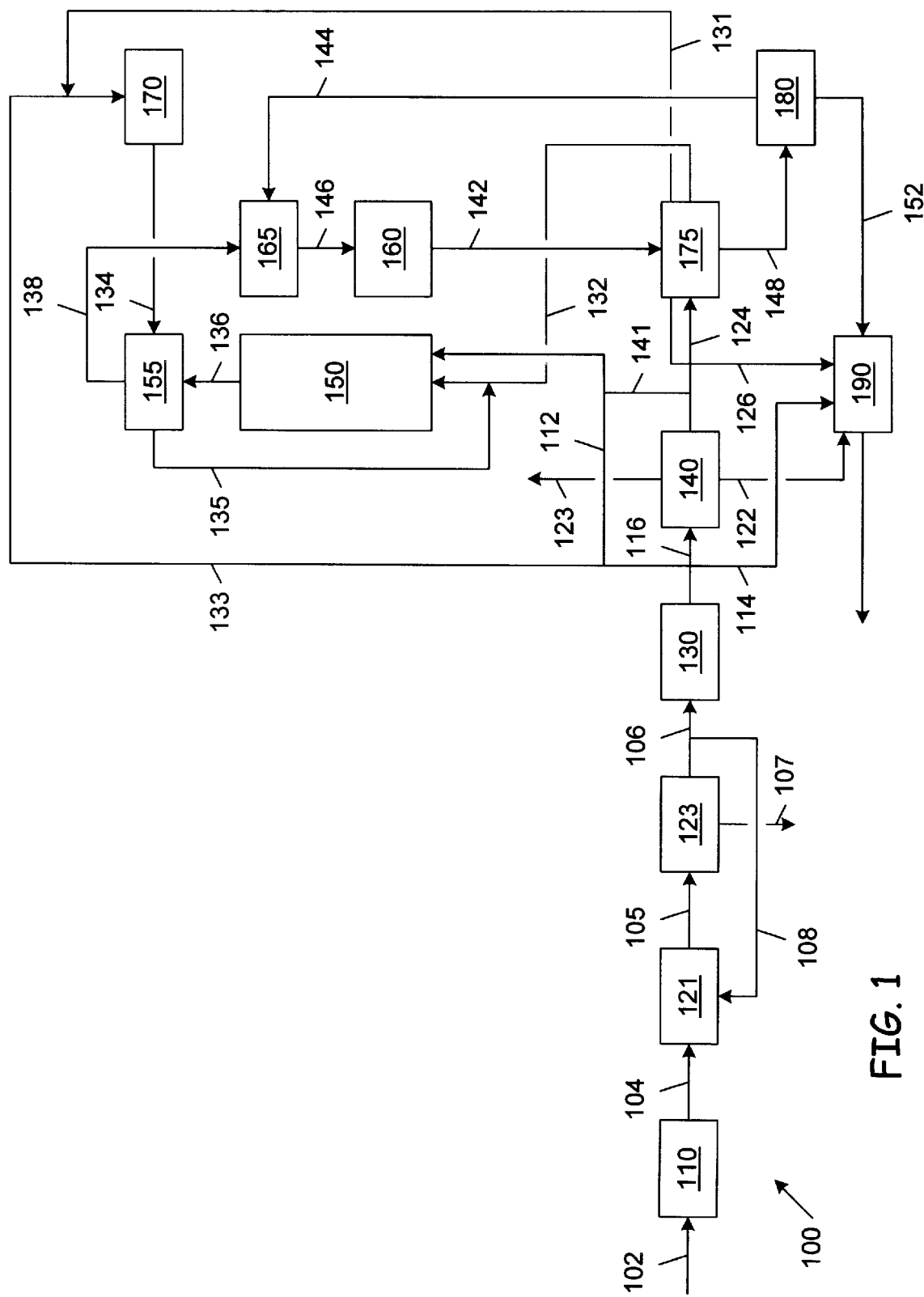
FIG. 1 depicts a system for producing naphtha fuel from landfill gas.

Referring to system 100, depicted in FIG. 1, an embodiment of a method for the conversion of landfill gas to naphtha gas is described in more detail. A landfill gas stream, which includes carbon dioxide and methane, is preferably introduced into the system via conduit 102. The landfill gas stream is preferably introduced at a feed rate of between about 1 to 15 million standard cubic feet per day ("MMSCFD"), more preferably at a feed rate between about 10 to 15 MMSCFD, and more preferably still at a feed rate of about 10 MMSCFD. The landfill gas stream is preferably collected through a series of wells and pipe laterals which are disposed throughout a landfill site. The collected gas typically includes a significant amount of water. As part of the purification of the landfill gas stream, the water contained in the landfill gas stream is preferably removed. Removal of the water may be accomplished by use of phase separator 110, gas dehydration system, or, preferably, a combination of both.

The landfill gas stream is preferably conducted to phase separator 110 via conduit 102. Phase separator 110 is preferably configured to separate liquid water from the gas stream. After the liquid water has been separated from the landfill gas stream, the effluent stream is conducted from phase separator 110 to a dehydration system via conduit 104. The dehydration system is preferably configured to remove the condensed water from the gas stream such that a dehydrated gas stream is produced. The dehydration system preferably includes a gas compressor 121 and a refrigeration system 123. The effluent stream is preferably passed through gas compressor 121 where the gas stream is raised, in one embodiment, to pressures of between about 7 to about 10.5 bar (about 100 to about 150 psig), preferably about 9 bar (130 psig). After pressurization, the stream is conducted to a refrigeration system 123 via conduit 105 where the temperature of the stream is lowered, in one embodiment, to between about 0 to about 7.5° C. (32 to about 45° F.), preferably about 4.5° C. (40° F.). The increase in pressure, along with the lower temperatures, preferably causes the condensation of any water remaining in the gas stream. The condensed water is preferably separated from the gas stream within the refrigeration system 123 for a substantially dehydrated gas stream. The water is preferably removed from the system via conduit 107. The dehydrated gas stream thus formed is preferably substantially free of water.

The dehydrated gas stream is preferably conducted via conduit 106 from the dehydration system to pretreatment system 130. A portion of the dehydrated gas stream may be fed into gas compressor 121 of the dehydration system via conduit 108. Up to about 10% of the dehydrated gas stream may be diverted to the gas compressor. The use of a portion of the dehydrated gas stream to fuel the gas compressor may allow the dehydration system to be utilized without the use of an external gas supply, thus reducing the operating expenses of the system.

Pretreatment system 130 is preferably configured to substantially remove contaminants, such as VOCs and hydrogen sulfide, which are typically present in landfill gas streams. The VOCs may be removed by use of an adsorbent column, preferably by the use of an activated carbon based adsorbent column. The dehydrated gas stream is preferably passed over a bed of activated carbon. The concentration of VOCs in the dehydrated gas stream, after pretreatment, is preferably less than about 0.1 ppmv. While the use of activated carbon for the removal of VOCs is described, it is to be understood that any means for removing the VOCs, without significantly effecting the methane content of the gas stream, may be used.

After removal of the VOCs, the gas stream is passed to a hydrogen sulfide removal system. In one embodiment, a desulfurization system may include a reactor filled with a hydrogenation catalyst and zinc oxide. As the dehydrated gas stream is passed through the reactor, the hydrogen sulfide is preferably absorbed by the zinc oxide. A desulfurization system is commercially available from Hydro-Chem, Holly Springs, Ga. While the use of a zinc oxide system for the removal of hydrogen sulfide is described, it is to be understood that any means for removing hydrogen sulfide from a gas stream, without significantly effecting the methane content of the gas stream, may be used.

The combination of a VOC removal and desulfurization preferably produces a purified landfill gas stream that is about 40–60% by volume methane and about 40–60% by volume carbon dioxide. VOCs, hydrogen sulfide, and water preferably comprise less than about 1% of the purified landfill gas stream, more preferably less than about 0.1%, of the purified landfill gas stream, after passage through the pretreatment system.

The purified landfill gas stream may be separated into three streams. The first stream may be conducted via conduit 112 to hydrogen reformer 150. The first stream may be used as fuel for hydrogen reformer 150. Up to about 10% of the purified landfill gas stream may be used as fuel for the hydrogen reformer. The second stream is preferably conducted via conduit 114 to mixer 190. The second stream is used as a source of methane and carbon dioxide gases for the final blending of the gas streams to form naphtha gas. Up to about 20% of the purified landfill gas stream may be used in mixer 190. The remainder of the gas, up to about 70% of the purified landfill gas stream, is preferably conducted via conduit 116 to methane purification system 140.

Methane purification system 140 is preferably configured to separate the methane gas from the carbon dioxide gas of the purified landfill gas stream. Preferably, two substantially pure gas streams, a substantially pure methane stream and a substantially pure carbon dioxide stream, are produced. Systems and methods for purifying such gas streams are described in U.S. Pat. No. 4,077,779 to Sircar et al., U.S. Pat. No. 4,770,676 to Sircar, et al. and U.S. Pat. No. 5,681,360 to Siwajek et al.

In an embodiment, the separation of methane from the carbon dioxide is preferably accomplished by passing the mixed gas stream through a pressure swing adsorption separation system. The pressure swing adsorption system involves the use of an adsorbent bed which selectively adsorbs one component (e.g., carbon dioxide) over the other component (e.g., methane) of a mixed gas stream. The adsorbent bed may be made from a variety of adsorbents, including but not limited to, zeolites, aluminas, silica gels and activated carbon. Preferably, the adsorbent chosen will selectively adsorb carbon dioxide over methane.

The purified landfill gas stream is preferably passed over a carbon dioxide selective adsorbent bed at high pressure. Preferably the purified landfill gas stream is maintained at a pressure of between about 6 to about 10 bar (about 90 to about 140 psig), preferably about 8.5 bar (125 psig). During the passage of the purified landfill gas stream over the adsorbent bed, the temperature of the stream is preferably maintained between about 32 to about 52° C. (about 50 to about 125° F.), preferably about 24° C. (75° F.). After passage of the purified landfill gas stream over the adsorbent bed, the resulting stream is preferably enriched in methane gas. Preferably a high purity methane stream (e.g., a stream having greater than about 99% by volume methane) is produced by passage of the purified landfill gas stream over the adsorbent bed. Additionally, the yield of the process (i.e., the amount of methane recovered from the total methane in the purified landfill gas stream) is preferably greater than about 99%.

Eventually, the adsorbent bed may become saturated with the removed carbon dioxide. When the adsorbent bed is saturated, the adsorptive capacity of the adsorbent bed is reached and the particles may no longer remove carbon dioxide from the purified landfill gas stream. The adsorbed carbon dioxide is preferably desorbed from the purified landfill gas stream by reducing the pressure of the system to produce a substantially pure carbon dioxide stream. Preferably the system is reduced to a pressure of between about 150 to 200 torr. By reducing the system to a pressure that is substantially below atmospheric, the adsorbent is preferably substantially freed of carbon dioxide. After most of the carbon dioxide is removed, the adsorbent may be reused for the purification of the purified landfill gas stream.

Preferably, the pressure swing adsorption purification process is performed using two or more adsorbent beds. When two beds are used, one bed may be used for the purification of the purified landfill gas stream, while the other bed is undergoing a desorption process in preparation for reuse. Utilizing more than two beds tends to further increase the efficiency of operation by allowing additional process steps for purge and repressurization. Thus, each bed cyclically goes through an adsorption and desorption process. This allows a continuous feed and product gas flow to be achieved by the synchronized use of a multibed system.

In another embodiment, the separation of the methane gas from the purified landfill gas stream may be accomplished by the use of a liquid absorbent. The liquid absorbent preferably selectively absorbs carbon dioxide from the purified landfill gas stream. The purified landfill gas stream is preferably flowed in a countercurrent direction to the flow of the liquid absorbent through an absorption column. As the purified landfill gas stream is flowed through the absorbance column, carbon dioxide is preferably removed from the stream to generate a substantially pure methane stream. Liquids which may be used as carbon dioxide selective absorbents include, but are not limited to, aqueous solutions of alkali metal carbonates, aqueous solutions of alkanolamines, and aqueous solutions of alkali metal phosphates. A method and system for the removal of carbon dioxide using a liquid absorbent is described in U.S. Pat. No. 4,957,715 to Grover et al. which is incorporated by reference as if set forth herein.

Figure 2:
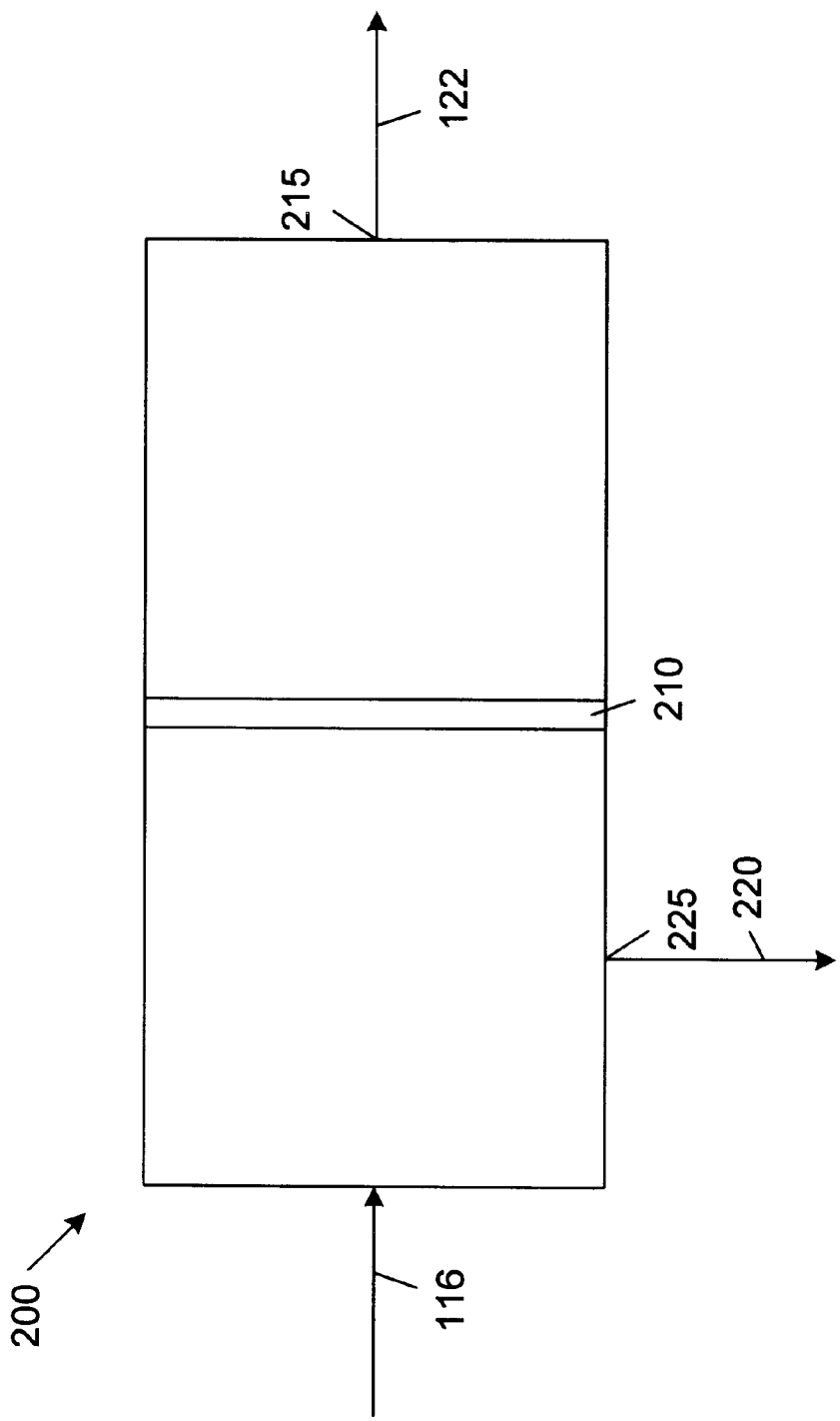
FIG. 2 depicts a membrane based methane purification system.

In another embodiment, the separation of methane from the purified landfill gas stream may be accomplished by the use of a membrane which selectively permits the passage of either carbon dioxide or methane. A membrane-based methane purification system 200 is depicted in FIG. 2. System 200 preferably includes a gas selective membrane 210 positioned within the body of the system. Preferably, membrane 210 is configured to permit the passage of carbon dioxide, while inhibiting the flow of methane. As the purified landfill gas stream is passed to the membrane separation system 200 via conduit 116, the carbon dioxide preferably passes through membrane 210. The carbon dioxide is preferably passed out of system 200 via an outlet 215 positioned downstream from membrane 210 through conduit 122. The retained methane gas is preferably passed from system 200 through an outlet 225 upstream from membrane 210. A series of selectively permeable membranes may be used to remove methane from the purified landfill gas stream. A method and system for the separation of methane from a gas stream by the use of a selectively permeable membrane is described in U.S. Pat. No. 5,411,721 to Doshi et al. which is incorporated by reference as if set forth herein.

After passage of the purified landfill gas stream through methane purification system 140 two gas streams are preferably produced. Preferably, a first stream of substantially pure carbon dioxide, and a second stream of substantially pure methane are produced. A portion of the carbon dioxide stream may be conducted to mixer 190 via conduit 122 for eventual mixing with other process streams. The portion of the carbon dioxide stream not required for forming the naphtha gas stream is preferably vented from the system via conduit 123. The second stream is further divided into two methane process streams. The first methane stream is sent via conduit 124 to hydrogen reformer 150 for further processing. The second methane stream is preferably sent via conduit 126 to mixer 190, where it is blended with other gases produced by the system to form a naphtha gas stream. Up to about 60% of the methane gas stream is preferably sent to the mixer, while the remainder of the methane gas stream is sent to the hydrogen reformer.

The first methane gas stream is preferably transferred to heat exchanger 175 prior to being introduced into hydrogen reformer 150. Heat exchanger 175 may be used to preheat the methane gas stream before it reaches heat exchanger 175. After the operation of hydrogen reformer 150 and shift reactor 160 has started, hot effluent coming out of the shift reactor may be passed through the heat exchanger 175 via conduit 142. After passing through the heat exchanger 175, the first methane gas stream is transferred to hydrogen reformer 150 via conduit 132.

Hydrogen reformer 150 preferably converts the methane stream into a stream which includes hydrogen, carbon monoxide, and carbon dioxide. Hydrogen reformer systems are commercially available from Hydro-Chem, Holly Springs, Ga. Prior to entering the hydrogen reformer, the first methane gas stream is preferably mixed with super heated steam produced by steam boiler 170. Steam produced by steam boiler 170 is preferably passed via conduit 134 through heat exchanger 155. Steam boiler 170 may be fueled by either a portion of the purified landfill gas stream, introduced via conduit 133, a portion of the purified methane gas stream, introduced via conduit 131, or a mixture of the two streams.

Heat exchanger 155 is preferably used to further heat the steam produced by steam boiler 170. After the operation of hydrogen reformer 150 has started, hot effluent coming out of the hydrogen reformer may be passed through the heat exchanger 155 via conduit 136. After passing through the heat exchanger 155, the steam is conducted via conduit 135 to conduit 132, where it is mixed with the first methane stream to produce a steam mixed stream which includes steam and methane.

The mixed stream of methane gas and steam is preferably conducted through hydrogen reformer 150. Within hydrogen reformer 150 the steam mixed stream is preferably heated, in the presence of a transition metal catalyst (e.g., a nickel-, platinum-, or molybdenum-based catalyst), to a temperature of about 600 to about 1000° C. (about 1100 to about 1800° F.), preferably between about 700 to about 900° C. (about 1300 to about 1650° F.), more preferably between about 750 to about 870° C. (about 1400 to about 1500° F.). For example, if a nickel-based catalyst is used, the steam mixed stream is preferably heated to a temperature of about 760 to about 870° C. (about 1400 to about 1500° F.). Purified landfill gas from pretreatment reactor 130 is preferably used as fuel for the hydrogen reformer heaters. Alternatively, fuel for the hydrogen reformer may be drawn directly from the purified methane stream via conduit 141. As the mixed stream is passed through hydrogen reformer 150 the following reactions preferably occur:

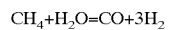
$$CH_4+H_2O=CO+3H_2$$

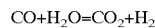
$$CO+H_2O=CO_2+H_2$$

The steam mixed stream is preferably passed through hydrogen reformer for a time sufficient to convert substantially all of the methane to hydrogen and carbon dioxide. A hydrogen reformer and its use is described in U.S. Pat. No. 4,089,941 to Villemin which is incorporated by reference as if set forth herein.

The reactions which occur in the conversion of methane to carbon monoxide and, ultimately, to carbon dioxide are all in equilibrium. By definition, any reaction in equilibrium is reversible. However, under certain conditions, a reaction may become substantially irreversible. Le Chatelier's Principle states that the position of the equilibrium (i.e., which products are favored) can be controlled by the concentrations of the reactants and products. The reactions which occur in the hydrogen reformer are preferably induced to proceed in a substantially irreversible manner by the use of excess water (i.e., steam). If a significant amount of carbon dioxide is present in the gas stream being passed through a hydrogen reformer, the carbon dioxide will tend to drive the reactions back toward the reactants (i.e., methane). Thus, the presence of carbon dioxide in the mixed stream would tend to reduce the amount of hydrogen produced by effecting the equilibrium of the conversion of methane to hydrogen. To allow the highest possible conversion of methane to hydrogen to occur, the use of a purified methane stream, along with excess water, is preferred.

After passing through hydrogen reformer 150, the effluent gas stream is preferably conducted via conduit 136 through heat exchanger 155. Heat exchanger 155 preferably allows the effluent stream from hydrogen reformer 150 to pass through in such a way that the heat from the effluent stream will provide additional heat to the steam from boiler 170 passing through heat exchanger 155 via conduit 134. Concurrently, the effluent stream is preferably substantially cooled during passage through heat exchanger 155.

The effluent stream may then be transferred to cooler 165 via conduit 138. Cooler 165 preferably lowers the temperature of the effluent gas stream to about 260 to 430° C. (about 500 to 800° F.). Preferably, cooler 165 is configured to add cooling water to the gas stream to lower the temperature. The cooling water is preferably water at a temperature that is substantially lower than the temperature of the incoming gas stream. Water for cooler 165 may be supplied from cooler 180 via conduit 144.

After the effluent stream is cooled, the stream is preferably passed into shift reactor 160 via conduit 146. Shift reactor 160 preferably converts any remaining carbon monoxide in the effluent stream into hydrogen and carbon dioxide. Shift reactor systems are commercially available from Hydro-Chem, Holly Springs, Ga. Within shift reactor 160, the effluent stream is preferably passed over a carbon monoxide shift catalyst. As the effluent stream is passed through shift reactor 160, any carbon monoxide present in the stream is preferably converted to hydrogen and carbon dioxide by the following reaction:

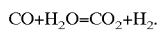

$$CO+H_2O=CO_2+H_2.$$

The effluent stream is preferably passed through shift reactor 160 for a time sufficient to convert a substantial portion of the carbon monoxide to hydrogen and carbon dioxide.

The treatment of a methane stream with water in hydrogen reformer 150 and shift reactor 160 preferably converts a substantial portion of the methane stream to a hydrogen-bearing stream which includes mainly hydrogen and carbon dioxide. Overall, the reaction may be written as:

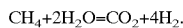

$$CH_4+2H_2O=CO_2+4H_2.$$

The use of a high purity methane stream, rather than an unpurified methane stream, preferably allows the overall reaction to be driven toward an efficient 4:1 production of hydrogen and carbon dioxide from methane.

After the effluent stream is passed through shift reactor 150, the resulting hydrogen-bearing stream is preferably conducted to heat exchanger 175. Heat exchanger 175 preferably allows the hydrogen-bearing stream to pass through in such a way that the heat from the stream will provide heat to the purified methane stream passing through heat exchanger 175 via conduit 124. After passage through heat exchanger 175, the hydrogen-bearing stream is preferably conducted to cooler 180 via conduit 148. Cooler 180 is preferably configured to lower the temperature of the hydrogen-bearing stream to near ambient temperatures. Additionally, the water present in the hydrogen-bearing stream is preferably separated from the hydrogen-bearing stream during the cooling process. Water produced by cooler 180 is preferably conducted to cooler 165, where it may be used to cool the effluent stream produced by hydrogen reformer 150.

Following cooling, the hydrogen-bearing stream preferably includes about 70–80% by volume hydrogen, 10–20% by volume carbon dioxide, 0–5%by volume carbon monoxide, and 0–5% by volume methane. Preferably, the hydrogen-bearing stream is substantially dry. The hydrogen-bearing stream is preferably sent via conduit 152 to mixer 190. In mixer 190, the hydrogen-bearing stream is preferably blended with a portion of the purified landfill gas stream and a portion of the purified methane gas stream to form a naphtha gas stream. The purified landfill gas stream is preferably obtained from the pretreatment system 130 via conduit 114. The purified methane gas stream is preferably obtained from methane purification system 140 via conduit 126. A source of pure carbon dioxide may also be added to mixer 190 via conduit 122, to ensure a proper naphtha gas is produced. Preferably, carbon dioxide may be drawn from methane purification system 140. The addition of carbon dioxide may not be required, since sufficient carbon dioxide is typically present in the hydrogen-bearing stream and the purified landfill gas stream to produce naphtha gas.

The streams are preferably blended within mixer 190 to produce a gas stream meeting the specification required by naphtha gas. The ratio of each gas stream is preferably controlled to achieve this blend. The naphtha gas formed preferably includes between about 40–60% hydrogen, between about 20–40% methane, and between about 10–30% carbon dioxide. More preferably, the formed naphtha gas includes between about 48–51% by volume hydrogen, between about 27–31% by volume methane, between about 17–19% by volume carbon dioxide, between about 0–2.5% by volume carbon monoxide, between about 0–0.5% by volume water, less than about 0.2% by volume oxygen, and less than about 0.1 ppmv VOCs and hydrogen sulfide.

In an embodiment, naphtha gas may be produced by mixing a hydrogen-bearing stream having a flow rate of about 6.25 MMSCFD, with a purified methane stream having a flow rate of about 1.75 MMSCFD, and a purified landfill gas stream having a flow rate of about 2 MMSCFD. The mixture of these streams, at these flow rates, preferably produces a naphtha gas stream having a composition of about 50% by volume hydrogen, about 28% by volume methane, about 19% by volume carbon dioxide, and about 3% by volume carbon monoxide. Preferably, the resulting naphtha gas stream will have a flow rate of about 10 MMSCFD.

A controller or set of controllers may control the components of the system at various stages of the process. The controller may be a computer, programmable logic controller, or any of other known controller systems known in the art. The controller may control such aspects as flow rate, temperature, pressure, and mixing ratios of the process stream and of the various components of the system.

Overall, the process is capable of converting a gas stream which includes methane and carbon dioxide into a naphtha gas stream. The process offers a number of advantages for a supplier of naphtha gas. The process may be used to convert landfill gas directly into naphtha gas, thus taking advantage of a relatively abundant and renewable energy source. Further, the process produces a number of different gas streams which may be used as fuel for a number of the components of the system. For example, the purified landfill gas stream or the purified methane gas stream may be used as a fuel for various heating components of the system. The use of these intermediary gas streams as fuel sources may decrease the per unit cost of the process. Since very little fuel is imported from outside the system to run the various components, the operating costs of such a system may be minimized. The combination of a methane purification system with a hydrogen reformer thus allows the efficient and economical transformation of landfill gas to naphtha gas to be realized.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims.

What is claimed is:

1. A method for the production of a naphtha gas stream from a mixed gas Seam, the naphtha gas stream comprising hydrogen, methane and carbon dioxide, the mixed gas stream comprising methane and carbon dioxide, comprising:

separating the mixed gas stream into a first mixed gas stream and a second mixed gas stream;

separating methane from the first mixed gas stream to produce a substantially purified methane gas stream;

separating the substantially purified methane gas stream into a first methane gas stream and a second methane gas stream;

converting methane in the first methane gas stream into carbon dioxide and hydrogen such that the first methane gas stream is substantially converted into a hydrogen-bearing gas stream, the hydrogen-bearing gas stream comprising hydrogen and carbon dioxide; and combining the hydrogen-bearing gas stream with the second methane gas stream and the second mixed gas stream to produce the naphtha gas stream.

2. The method of claim 1, wherein the mixed gas stream is collected from a landfill.

3. The method of claim 1, wherein the mixed gas stream is substantially free of volatile organic compounds, and wherein the mixed gas stream is substantially free of hydrogen sulfide.

4. The method of claim 1, wherein the methane of the mixed gas stream comprises at least about 40% of a total volume of the mixed gas stream.

5. The method of claim 1, wherein separating the mixed gas stream comprises forming the first mixed gas stream from up to about 70% of a total volume of the mixed gas stream, and wherein up to about 30% of the total volume of the mixed gas stream is used to form the second mixed gas stream.

6. The method of claim 1, wherein separating methane from the first mixed gas stream comprises passing the first mixed gas stream through a pressure swing adsorption separation system.

7. The method of claim 1, wherein separating methane from the first mixed gas stream comprises passing the first mixed gas stream over an adsorbent bed, wherein the adsorbent bed selectively adsorbs carbon dioxide from the first mixed gas stream.

8. The method of claim 1, wherein separating methane from the first mixed gas stream comprises passing the first mixed gas stream over a liquid absorbent bed, wherein the liquid absorbent bed selectively absorbs carbon dioxide from the first mixed gas stream.

9. The method of claim 1, wherein separating methane from the first mixed gas stream comprises passing the first mixed gas stream through a membrane based separation system.

10. The method of claim 1, wherein separating methane from the first mixed gas stream comprises passing the first mixed gas stream through a selectively permeable membrane, wherein the membrane substantially inhibits passage of methane through the membrane.

11. The method of claim 1, wherein separating the methane gas stream comprises forming the first methane gas stream from up to about 40% of a total volume of the methane gas stream, and wherein up to about 60% of the total volume of the methane gas stream is used to form the second methane gas stream.

12. The method of claim 1, wherein the conversion of methane into carbon dioxide and hydrogen comprises passing the first methane gas stream through a hydrogen reformer.

13. The method of claim 1, wherein the conversion of methane into carbon dioxide and hydrogen comprises passing the first methane gas stream through a hydrogen reformer at a temperature of between about 600 to about 900° C. (about 1100° F. to about 1650° F.).

14. The method of claim 1, wherein the conversion of methane into carbon dioxide and hydrogen comprises mixing the first methane gas stream with steam to form a steam mixed stream comprising methane and water, and further comprising passing the steam mixed stream through a hydrogen reformer at a temperature of between about 600 to about 900° C. (about 1100° F. to about 1650° F.).

15. The method of claim 14 further comprising cooling an effluent stream from the hydrogen reformer to a temperature of between about 260 to 430° C. (between about 500 to 800° F.).

16. The method of claim 1, wherein conversion of methane into carbon dioxide and hydrogen comprises passing the first methane gas stream through a hydrogen reformer, and further comprises passing an effluent gas stream from the hydrogen reformer through a shift reactor.

17. The method of claim 1, wherein conversion of methane into carbon dioxide and hydrogen comprises passing the first methane gas stream through a hydrogen reformer, wherein an effluent gas stream comprising hydrogen, carbon dioxide and carbon monoxide is formed, and further comprises passing the effluent gas stream through a shift reactor, wherein carbon monoxide in the effluent stream is substantially converted to carbon dioxide and hydrogen.

18. The method of claim 17 further comprising cooling the effluent stream prior to passing the effluent stream through the shift reactor.

19. The method of claim 1, wherein the hydrogen-bearing stream further comprises water, and further comprising removing the water from the hydrogen-bearing stream prior to mixing the hydrogen-bearing stream with the second methane gas stream and the second mixed gas stream.

20. The method of claim 1, wherein the hydrogen-bearing gas stream comprises at least about 70% by volume hydrogen.

21. The method of claim 1, wherein the hydrogen in the naphtha gas stream comprises between about 40 to 60% of a total volume of the naphtha gas stream, and wherein the methane in the naphtha gas stream comprises between about 20 to 40% of the total volume of the naphtha gas stream, and wherein the carbon dioxide comprises between about 10 to 30% of the total volume of the naphtha gas stream.

22. The method of claim 1, wherein the mixed gas stream has a flow rate of between about 1 to 15 million standard cubic feet per day.

23. The method of claim 1, wherein the naphtha gas stream is produced such that the naphtha gas stream has a flow rate of between about 1 to 15 million standard cubic feet per day.

24. The method of claim 1, wherein separating methane from the first mixed gas stream further comprises producing a substantially purified carbon dioxide stream.

25. The method of claim 24, wherein combining the hydrogen-bearing stream with the second methane gas stream further comprises combining the purified carbon dioxide stream with the hydrogen-bearing stream.

26. A method for the production of a naphtha gas stream from a landfill gas stream, the naphtha gas stream comprising hydrogen, methane and carbon dioxide, the landfill gas stream comprising methane, carbon dioxide, water and contaminants, comprising:

removing the water from the landfill gas stream to produce a substantially dehydrated gas stream;

removing the contaminants from the substantially dehydrated gas stream to produce a purified landfill gas stream comprising methane and carbon dioxide;

separating the purified landfill gas stream into a first purified landfill gas stream and a second purified landfill gas stream;

separating methane gas from the first purified landfill gas stream to produce a substantially purified methane gas stream;

separating the substantially purified methane gas stream into a first methane gas stream and a second methane gas stream;

converting the methane in the first methane gas stream into carbon dioxide and hydrogen such that the first methane gas stream is substantially converted into a hydrogen-bearing gas stream, the hydrogen-bearing gas stream comprising hydrogen and carbon dioxide; and mixing the hydrogen-bearing gas stream with the second methane gas stream and the second purified landfill gas stream to produce the naphtha gas stream.

27. The method of claim 26, wherein removing the water from the landfill gas stream comprises passing the landfill gas stream through a phase separator, wherein liquid water is substantially removed from the landfill gas stream.

28. The method of claim 26, wherein removing the water from the landfill gas stream comprises passing the landfill gas through a dehydration system, wherein the dehydration system is configured to increase a pressure of the landfill gas stream, and wherein the dehydration system is configured to lower a temperature of the landfill gas stream, and wherein the combination of the increased pressure and the lower temperature allows a substantial portion of the water to be removed.

29. The method of claim 26, wherein removing the water from the landfill gas stream comprises passing the landfill gas stream through a phase separator, wherein water in a liquid phase is substantially removed from the landfill gas stream, and further comprising passing the landfill gas through a dehydration system, wherein the dehydration system is configured to increase a pressure of the landfill gas stream, and wherein the dehydration system is configured to lower a temperature of the landfill gas stream, and wherein the combination of the increased pressure and the lower temperature allows a substantial portion of the water to be removed.

30. The method of claim 26, wherein the removal of the contaminants comprises passing the landfill gas stream over an adsorbent column.

31. The method of claim 30, wherein the contaminants comprise volatile organic compounds, and wherein the adsorbent column comprises an activated carbon bed.

32. The method of claim 26, wherein the removal of the contaminants comprises passing the landfill gas stream over an adsorbent column, and further comprising passing the landfill gas stream through a desulfurization system.

33. The method of claim 32, wherein the contaminants comprise volatile organic compounds and hydrogen sulfide, and wherein the adsorbent column comprises an activated carbon bed configured to substantially remove the volatile organic compounds, and wherein the desulfurization system is configured to substantially remove the hydrogen sulfide.

34. The method of claim 26, wherein the methane of the landfill gas stream comprises at least about 40% of a total volume of the landfill gas stream.

35. The method of claim 26, wherein separating methane from the first purified landfill gas stream comprises passing the first purified landfill gas stream through a pressure swing adsorption separation system.

36. The method of claim 26, wherein separating methane from the first purified landfill gas stream comprises passing the first purified landfill gas stream over an adsorbent bed, wherein the adsorbent bed selectively adsorbs carbon dioxide from the first purified landfill gas stream.

37. The method of claim 26, wherein the conversion of methane into carbon dioxide and hydrogen comprises passing the first methane gas stream through a hydrogen reformer.

38. The method of claim 26, wherein conversion of methane into carbon dioxide and hydrogen comprises passing the first methane gas stream through a hydrogen reformer, and further comprising passing an effluent gas stream from the hydrogen reformer through a shift reactor.

39. The method of claim 26, wherein the hydrogen-bearing stream further comprises water, and further comprising removing the water from the hydrogen-bearing stream prior to mixing the hydrogen-bearing stream with the second methane gas stream and the second purified landfill gas stream.

40. A method for the production of a naphtha gas stream from a landfill gas stream, the naphtha gas stream comprising hydrogen, methane and carbon dioxide, the landfill gas stream comprising methane, carbon dioxide, water, volatile organic compounds, and hydrogen sulfide, comprising:

passing the landfill gas stream through a dehydration system, wherein the dehydration system is configured to increase a pressure of the landfill gas stream, and wherein the dehydration system is configured to lower a temperature of the landfill gas stream, and wherein the combination of the increased pressure and the lower temperature allows a substantial portion of the water to be removed producing a dehydrated gas stream;

passing the dehydrated gas stream through an adsorbent column, wherein the volatile organic compounds are substantially removed;

passing the dehydrated gas stream through a desulfurization system, wherein the hydrogen sulfide is substantially removed from the dehydrated gas stream, wherein passage of the dehydrated gas stream through the adsorbent column and through the desulfurization system produces a purified landfill gas stream comprising methane and carbon dioxide;

separating the purified landfill gas stream into a first purified landfill gas stream and a second purified landfill gas stream;

passing the first purified landfill gas stream through a pressure swing adsorption separation system, wherein methane is removed from the first purified landfill gas stream to produce a methane gas stream;

separating the methane gas stream into a first methane gas stream and a second methane gas stream;

passing the first methane gas stream through a hydrogen reformer, wherein the first methane gas stream is substantially converted into a hydrogen reformer effluent stream, the hydrogen reformer effluent stream comprising carbon dioxide, carbon monoxide, and hydrogen;

passing the hydrogen reformer effluent stream through a shift reactor, wherein the hydrogen reformer effluent stream is substantially converted into a hydrogen-bearing stream, the hydrogen-bearing stream comprising hydrogen and carbon dioxide; and mixing the hydrogen-bearing stream with the second methane gas stream and the second purified landfill gas stream to produce the naphtha gas stream.

41. The method of claim 40, wherein the hydrogen in the naphtha gas stream comprises between about 40 to 60% of a total volume of the naphtha gas stream, and wherein the methane in the naphtha gas stream comprises between about 20 to 40% of the total volume of the naphtha gas stream, and wherein the carbon dioxide comprises between about 10 to 30% of the total volume of the naphtha gas stream.

42. A method for the production of a naphtha gas stream, comprising:

obtaining a mixed gas stream comprising methane and carbon dioxide; producing a methane gas stream and a hydrogen-bearing stream from at least a first portion of the mixed gas stream; and mixing a second portion of the mixed gas stream with the methane gas stream and the hydrogen-bearing stream to produce the naphtha gas stream.

43. A system for the production of a naphtha gas stream from a landfill gas stream, the naphtha gas stream comprising hydrogen, methane and carbon dioxide, the landfill gas stream comprising methane, carbon dioxide, water, and contaminants, comprising:

a landfill gas purification system configured to remove water and contaminants from the landfill gas stream to produce a purified landfill gas stream;

a methane separation system coupled to the landfill gas purification system and configured to separate methane from the landfill gas stream to produce a methane gas stream;

a methane conversion system coupled to the methane separation system and configured to convert the methane gas stream to a hydrogen-bearing stream comprising hydrogen and carbon dioxide; and a mixer coupled to the landfill gas purification system, to the methane purification system, and to the hydrogen bearing stream, the mixer configured to mix portions of the purified landfill gas stream, the methane gas stream, and the hydrogen-bearing stream to produce a naphtha gas stream.

44. The system of claim 43, wherein the land fill gas purification system comprises a phase separator configured to remove at least a portion of the water from the land fill gas stream.

45. The system of claim 43, wherein the land fill gas purification system comprises a dehydration system configured to remove at least a portion of the water from the land fill gas stream.

46. The system of claim 43, wherein the land fill gas purification system comprises a pretreatment system configured to remove at least a portion of the contaminants from the land fill gas stream.

47. The system of claim 46, wherein the contaminants of the landfill gas stream comprise volatile organic compounds, and wherein the pretreatment system comprises an adsorbent column configured to remove at least a portion of the volatile organic compounds from the land fill gas stream.

48. The system of claim 46, wherein the contaminants of the landfill gas stream comprise hydrogen sulfide, and wherein the pretreatment system comprises a desulfurization system configured to remove at least a portion of the hydrogen sulfide from the land fill gas stream.

49. The system of claim 43, wherein the contaminants of the landfill gas stream comprise volatile organic compounds and hydrogen sulfide, and wherein the land fill gas purification system comprises a phase separator, a dehydration system, and a pretreatment system, wherein the pretreatment system comprises an absorbent column and a desulfurization system.

50. The system of claim 43, wherein the methane separation system comprises a pressure swing adsorption separation system.

51. The system of claim 43, wherein the methane separation system comprises a liquid absorbent separation system.

52. The system of claim 43, wherein the methane separation system comprises a membrane based purification system.

53. The system of claim 43, wherein the methane conversion system comprises a hydrogen reformer and a shift reactor.

* * * * *

UNITED STATES PATENT AND TRADEMARK OFFICE
CERTIFICATE OF CORRECTION

PATENT NO. : 6,071,326
DATED : June 6, 2000
INVENTOR(S) : Thomas Lee Hall

It is certified that error appears in the above-indentified patent and that said Letters Patent is hereby corrected as shown below:

Claim 1, col. 11, line 19, please delete "Seam" and substitute therefor --stream--.

Signed and Sealed this

Twentieth Day of March, 2001

Attest:

NICHOLAS P. GODICI

*Attesting Officer*   *Acting Director of the United States Patent and Trademark Office*